United States Patent [19]

Strelow

[11] 4,096,990

[45] Jun. 27, 1978

[54] DIGITAL DATA COMPUTER PROCESSING SYSTEM

[75] Inventor: Horst Strelow, Weddel, Germany

[73] Assignee: Siemens Aktiengesellschaft, Berlin & Munich, Germany

[21] Appl. No.: 752,426

[22] Filed: Dec. 13, 1976

[30] Foreign Application Priority Data

Mar. 22, 1976 Germany .............................. 2612100

[51] Int. Cl.² .......................................... G06F 11/08
[52] U.S. Cl. ................................................. 235/307
[58] Field of Search ........................ 235/153 AE, 307; 340/146.1 BE; 364/200, 900

[56] References Cited

U.S. PATENT DOCUMENTS

| | | | |
|---|---|---|---|
| 3,517,174 | 6/1970 | Ossfeldt | 235/153 AE |
| 3,646,516 | 2/1972 | Flinders et al. | 340/146.1 BE |
| 3,810,119 | 5/1974 | Zieve et al. | 364/200 |
| 4,012,717 | 3/1977 | Censier et al. | 364/200 |
| 4,020,349 | 4/1977 | Coomer | 235/153 AE |
| 4,030,074 | 6/1977 | Giorcelli | 235/153 AE |

*Primary Examiner*—Charles E. Atkinson

*Attorney, Agent, or Firm*—Hill, Gross, Simpson, Van Santen, Steadman, Chiara & Simpson

[57] ABSTRACT

A digital data computer processing system useful particularly for railway safety engineering which includes at least two central processing units with related input and output units which are controlled by a common pulse current supply and which uses a plurality of comparator units that receive inputs from the two computer processing units as well as an input from the pulse current supply which is fed in series through all of the comparator units and back to the pulse current supply such that when such signal returns through all of the comparator units to the pulse current supply it continues to enable both computer units and supply pulses and power to them. If the output signal from the pulse current supply does not return to the pulse current supply through the series connected comparators, the pulse current supply then disconnects power and pulses to the processing units so that error signals will not be provided to a controlled process. Two separate independent power supplies individually drive the two processing units.

8 Claims, 2 Drawing Figures

DIGITAL DATA COMPUTER PROCESSING SYSTEM

BACKGROUND OF THE INVENTION

1. Field of the Invention

This invention relates in general to digital data computer processing systems particularly for railway safety engineering and in particular to a novel digital data computer processing system.

2. Description of the Prior Art

Data processing systems for direct control of railroads or for monitoring of nuclear reactors must operate so as to be extremely safe such that in the event of possible errors occurring in the data processing system the controlled process, as for example, the railroad which is to be controlled or the nuclear reactors which are to be monitored and controlled are placed in a condition which cannot cause harm or injury to human beings. For example, the philosophy of railway safety has long been that high signal levels should be allocated to all signals recognized as indicating a dangerous condition and the high signal level is switched from all output channels in the event of a malfunction in the data computer processing system. Such systems require installations which detect a defective data processing error early enough that control commands determined as a consequence of the defective data processing will not have had sufficient time to reach the controlled processes.

One possibility of increasing the useability of a data processing system is to change over to a second data processing system when an error occurs in the first data processing system. Such second data processing system is operated jointly in parallel with the first data processing system at all times and such systems assume that the second data processing system will not also become defective at the same time as the first data processing system.

Rather than switching off an entire data processing system, it is also possible to switch off only those portions of a data processing system which have been found to be defective.

In view of the necessary safety requirements, it is not feasible to switch off only certain portions of a double data processing system because there is no sufficiently safe error detection mechanism available for such purpose. It would also be dangerous to continue to operate with only one computer recognized for sure as being operative because the latter when operating in a solo condition could cause danger to human beings and material due to lack of reliable error detection mechanisms.

In specific applied instances in which in addition to safety an especially high degree of reliability is a necessary requirement, it is not sufficient to conduct parallel operation with two data processing systems since both data processing systems have to be switched off as soon as an error has been detected. The consequences of this fact is that at least one operating stoppage occurs. In order to eliminate operational stoppages of this type and obtain reliable multicomputer systems with a high degree of reliability, digital data processing systems using three simultaneously operating complete data processing systems have been proposed. The use of three computers increases the useability and reliability in particularly because the operating breakdowns caused by errors are kept particularly low. However, it is not entirely simple to obtain three computer operation since without sufficient synchronization of the data processing systems, comparison of the contents of the memories are of the processing results which are to be supplied to the processes being controlled is not possible. In existing data processing systems, rigidly allocated pulse current supplies are connected to be data processors which for reasons of maintenance are not allowed to be altered and generally all three of the data processing systems are supplied by a single common pulse current supply so as to contribute to the desirable synchronization of the three data processing systems. The coordination of the three data processing systems which is necessary if separate pulse supplies are used is accomplished in the known systems by means of a specific hardware unit which is called a multiprocessor system coordinator element which is connected in radial configuration with all three data processing systems. The use of the multiprocessor system coordinator element allows a program synchronization to occur which is of a type such that prior to each user program, the computers communicate the numbers of all start-ready programs to the multiprocessor system coordinator element and the computers receive from the multiprocessor system coordinator element a start-release command only for those program numbers for which a start-readiness was supplied to the coordinator by all three computers. So as to decrease the delay in error manifestation, intermediate results of the user program runs are additionally compared with one another in the multiprocessor system coordinator element and results supplied from computer checked programs which are interposed into the systems for so-called safe guarding systems can be used.

In the known three computer system and the process which is to be controlled, a selector unit is required which must be provided for each command channel for the output of the protected-safe guarded commands and the selector represents the decisive link in terms of safety. Such selector compares on all three output channels for the respective command channel the data obtained, respectively, in the 2V3 selector process and always forwards that information to the controlled process which is offered on at least two of the output channels of the three computer processing systems. By so doing, the output channel which offers divergent information is blocked and is indicated to be in a drop-out state. However, the same also applies in the case of a corresponding control signal from the multiprocessor system coordinator element. After the transition has been made from three computer operation to two computer operations the selector must prevent the output of data entirely if an error occurs again in one of the remaining two data processing systems which would be indicated by an information difference on the output channels of the two computers which had not yet been switched off. The selector then ensures that only a signal which corresponds to energy free operation inhibiting and thus non-dangerous state is issued to the controlled process. It is significant to note that the selector must be constructed with digital circuits having fail safe properties regarding signal technology.

It is very expensive to provide a three computer system of the above described type which must also include in the combination a multiprocessor system coordinator element so as to achieve the necessary safety factor and it should also be realized that a separate selector is necessary for each point of the process to be controlled and that data channels must be provided for this purpose.

Since the above cited known data processing systems have been constructed particularly the multiprocessor systems which are used for very complex problems which process large masses of data in the commercial field in order to regulate and control very complicated technological functions of the industrial sector, as for example data processing systems have been available up to the present only as very large and expensive installations. A change has been achieved by developments in the semiconductor technology where it has become possible to construct microcomputers. Microcomputers are apparatus which are much less expensive than the large prior art systems in terms of size and cost but they are also less flexible and have less capacity than the large prior art systems. The central element of a microcomputer as in the case of a large computer system is a central processing unit which in the case of the microcomputer is designated as a microprocessor and which is formed as an integrated circuit and may be purchased as a conventional structural element. For a microcomputer in addition to the microprocessor unit, at least one additional memory and one input-output unit are required.

For specific applications it is not absolutely necessary to use the above described large computer systems, on the contrary, it would be sufficient for the particularly problem area to employ one or more microcomputers which depending upon the problem must function with the safety factor required in a digital data processing system. However, in the construction of a multicomputer data processing system with known multiprocessor system coordinator element and a number of selectors would result in expenses for the purpose of protecting the data which expense would far exceed the cost of the microcomputers. Thus, to use this approach for developing modern safe microcomputer circuits would not result in a marked improvement in cost of the systems.

SUMMARY OF THE INVENTION

The present invention utilizes the known digital data processing system and has a single storage element which is described in detail in U.S. Pat. No. 3,886,381 assigned to the assignee of the present invention.

This circuit system assures a high degree of protection against errors without the individual combinational logic elements and storage elements having to be constructed according to a fail safe principal. In this digital data processing system for safety switching devices, the individual processing units are provided in pairs and from an original processing channel and a synchronously operated complementary processing channel. In this system, the original processing channel as well as the complementary processing channel each contain one specific combinational logic element or storage element per processing unit so that both channels carry out of phase signals during orderly operation. It is significant that the out of phase signals can be monitored independently of the data flow whereby the safety with regard to prompt error detection is not dependent upon the general switching state of the two channels of the data processing system. In addition, it is significant that the circuits operate with square wave voltages as the logic switching signals and the square wave voltages have a predetermined repetition rate and amplitude and are derived from a common pulse current power supply with step by step triggering of the control signals whereby the two values ZERO and ONE of the logic variables differ by a phase shift of 180°. Thus, dynamic signals are provided in the original processing channel as well as in the complementary processing channel of the safety switching device independently of the respective values of the logic variables. Due to the particular character of the safety circuit and of the circuit elements employed, the processing units in the two channel function alternately in positive and negative logic during dynamic operation. The out of phase signals on the outputs of the two comparable circuit elements is checked at each processing step of the data processing systems by means of a specific comparator. All of these comparators are connected in series and when the output of all of the comparators have the right input signals so as to indicate error free operation, then an output from the last comparator will be supplied as an error free message to trigger the control signals required for the next processing step so that an additional monitoring per pulse from the common pulse current supply will be triggered.

The safety concept of this type allows a high degree of signal technological safety to be obtained. The probability with the present system of an error not being detected is extremely small.

The circuits of the system described above require specifically designed modules in order to achieve the necessary safety factor and the safety concept disclosed in this circuit system has not yet been realized in large scale integrated circuits. For this reason, a data processing system having the efficiency of a microcomputer would require a relatively large expenditure for the individual components.

The object of the present invention consists in providing a digital data processing system with a high degree of protection against errors and utilizes microcomputers wherein the outlay of complicated comparators normally used in the output channels of multicomputer systems is avoided. Also, it is desired that the data processing system of the invention be constructed with conventional sub-assemblies and components having small space requirements.

According to the invention, the safety problem is solved by using microcomputers which are fed from two direct current voltage sources which are independent of one another with the microprocessors of each of the microcomputers having equal number of terminals for addresses, data and control signals which are to be furnished and the connection pins being connected in pairs with one comparator for each pair. In addition, a monitor for the dynamic signals is provided in the pulse current supply which controls the switching off and on of the direct current voltage sources for the two computers.

The two channel data processing system thus consists of two non-fail safe control units which are independent of each other and which process the same data and solves the same problem and which can be chiefly utilized as program-controlled microcomputers but which can also be constructed in TTL techniques with fixed wired logic functions. The particular advantage of the data processing system of the invention is to be found in the universal application together with the lowest price for the comparator in that the comparators can be relatively simple structures. The data processing system makes it possible to provide exchange protected messages and are commands with virtually a random number of adjacent systems without additionally increasing the expenditure for comparing sub-assemblies for this purpose as is required in comparable prior art systems.

An additional advantage is to be found in the data processing system of the invention is that an extremely short time is required between the data flow dependent manifestation of the error and the switching off of the entire system. The reason for this is that contrary to conventional procedures, the data to be supplied to the control process are not compared with each other in common manner but after each pulse cycle an internal comparison is made which in the case of a comparator indicating a discrepancy immediately initiates a switch off procedure. It is not possible for a control unit constructed of conventional microprocessors to be turned off quicker than the present invention. Since during the processing pauses, so-called "safety programs" must be run in which all of the processing units are actuated to cause them to exchange data or process data, a defect which has occurred can also be detected when the data processing system or at least some sections of the system are not required for practical operations. This allows the time span between the occurrence of an error and its data flow dependent effect to be shortened.

If the data processing system is installed in an area in which, inspite of extensive shielding measures, electrical malfunctions can influence similar basic circuit blocks in the microcomputer as a consequence to cause similarly false data or commands in two separate channels which are under circumstances brought about by said electrical malfunctions and cannot be readily detected as erroneous by the comparators provided. Thus, the switching off of the entire data processing system which is desired for safety reasons may not occur. In accordance with the problem it is suggested regarding a further development of the invention, that undesirable influences of this type are to be avoided.

An advantageous further development of the invention, is that in the common pulse current supply for both channels there are provided controllable basic circuit elements which are independent of one another for the purposes of producing control pulses which are shifted in phase relative to one another such that the execution phases of the two microprocessors viewed from a time basis are shifted relative to each other.

Through this advantageous measure, the effect of the above cited electrical malfunctions which, inspite of specific shielding, many possibly simultaneously influence one pair of or several sub-assemblies in both channels of the data processing system can be externally distinguished with a high degree of probability and, thus, can be detected in the respective comparators.

So as to further increase the required safety factor, it is possible to additionally take into consideration that under certain circumstances, the operating time tolerance limits indicated for the elements provided in the microcomputers may be exceeded and must be detected.

According to a further development of the invention, the above cited disadvantage is eliminated by providing that the comparators each consist of one transistor amplifier with switching path connected to the output of a first D-flipflop through a rectifier bridge circuit and is also connected to the negative output of a second D-flipflop so that the signals to be compared are fed to the inputs of the first and second D-flipflops and the input pulses of all of the first and second D-flipflops are connected by way of two separate lines to the pulse current supply and wherein subsequent to the execution phases of the two microprocessors the signals to be compared are supplied to the D-flipflops on a time basis.

This advantageous measure prevents the dangerous effects which can arise as a result of exceeding time tolerances in the microcomputer elements and also provides the least possible slowing down of the processing speed of the two channel data processing system. The least possible slowing down of the processing speed of the two channel data processing system is achieved because the processing in the microprocessors is carried out on a pulse cycle and the respective comparison of the output signal states result from the preceeding processing step are simultaneously performed and are stored in the respective D-flipflops.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 1:
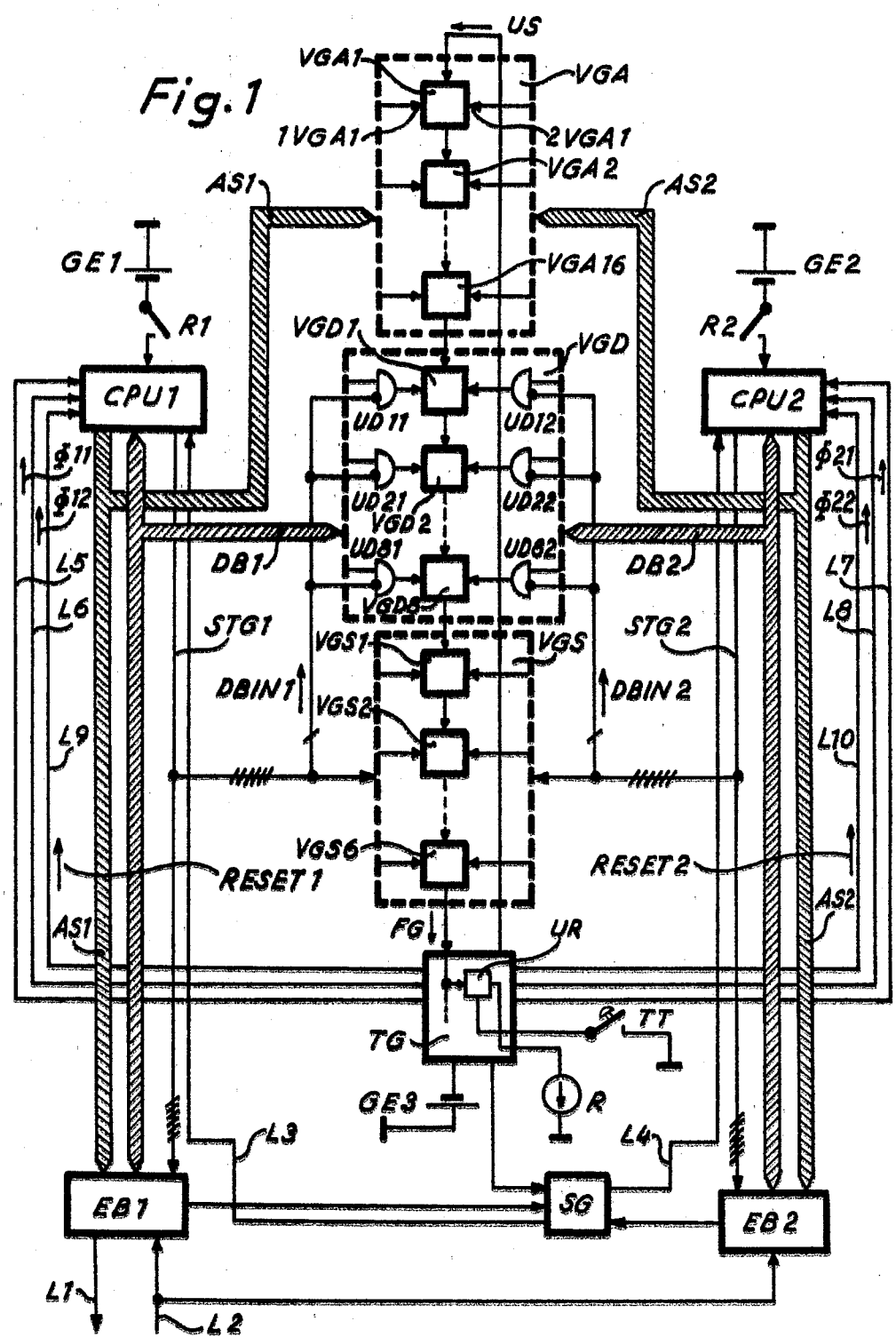
FIG. 1 illustrates a two channel data processing system using microcomputers such as type series 8080.

FIG. 1 illustrates the data processing system of the invention which comprises two separate channels with one channel comprising a microprocessing unit CPU1 which is connected by way of a 16 bit wide address bus AS1 to a supplementary module EB1. CPU1 is also connected by means of an 8 bit wide data bus DB1 to EB1. The CPU1 is also connected by a number of control lines STG1 which might be six in number to the element EB1. The supplementary modules EB1 may contain read only memories or RAM read-write memories as well as input and output units. By way of the supplementary modules EB1 and particularly their input-output units as well as output lines L1 and input lines L2 the data exchange with the process which is to be controlled is accomplished.

The second channel comprises a microprocessing unit CPU2 which is connected with its associated supplementary module EB2 by way of address bus AS2 which may be a 16 bit wide address bus, a data bus DB2 which may be an 8 bit wide data bus as well as control lines STG2. Each of the microprocessing units in the respective channels forms a microcomputer together with its supplementary modules. Since the supplementary modules EB2 need not include all of the output modules which are in the supplementary module EB1 since some outputs of the controlled process can be accomplished in a one channel fashion through supplementary modules EB1. Specific control signals which are designated such as INT, READY and HOLD, and which signals control both of the microprocessing units CPU1 and CPU2 are indirectly supplied by the supplementary modules EB1 and EB2 through a synchronization circuit SG which synchronizes control signals in both channels on lines L3 and L4 which are separated from each other.

For reasons of safety, both of the microprocessing units CPU1 and CPU2 are not supplied power from a common direct current voltage source but each are separately supplied from independent direct voltage sources GE1 and GE2 which are independent. These direct current voltage sources are connected into the circuit under the control of a pulse current supply TG which controls a relay R that controls contact R1 in one channel and contact R2 in the other channel. As illustrated in FIG. 1, the switches R1 and R2 are open and neither of the microprocessing units CPU1 and CPU2 are supplied current in the condition shown in FIG. 1. In order to start the entire two channel data processing system, a contact key TT connected to the supply TG is closed which supplies power from a power source GE3 to relay R so as to energize it so that it closes contacts R1 and R2 to apply power from the power supplies GE1 and GE2 to the microprocessors CPU1 and CPU2. The pulse current supply TC supplies control pulses $\phi 11$ and $\phi 12$ in stepwise fashion by way of lines L5 and L6 to microprocessing unit CPU1. Pulse current supply TG also supplies through separate lines L7 and L8 control pulses $\phi 21$ and $\phi 22$ in stepwise fashion to microprocessing unit CPU2. Pulse current supply TG also supplies on lines L9 and L10 which are independent of one another and which at the pulse current supply TG are connected to different sub-assembly elements which are independent of each other and corresponding to lines L5 and L6 and L7 and L8. The output of the control signals RESET1 and RESET2 are supplied to the microprocessing units CPU1 and CPU2. The supply of these signals listed above to the microprocessing units CPU1 and CPU2 provided in the two channels proceed by way of parts of the system which are independent of each other for the reason that in the event of a defect in a control line or in the event of an emission or a change of a signal a data processing occurs which is different from the data processing of the other channel and the change in data processing is detectable.

For purposes of comparison, a number of comparators are provided which correspond to the different signal groups from both channels. These comparators are integrated according to function. A line address comparator VGA contains 16 comparators VGA1, VGA2 through VGA16 for comparing signals on the equal value address lines of address buses AS1 and AS2 of each of the microprocessing units CPU1 and CPU2. In other words, the comparator VGA1 is in this manner connected with the corresponding pins of the two microprocessing units CPU1 and CPU2 which during orderly data processing receive two corresponding similar address bits.

A data comparator VGD includes 8 comparators VGD1, VGD2 through VGD8 for comparing signals on similar data lines of data buses DB1 and DB2 of each of the microprocessing units CPU1 and CPU2. The comparators VGD1 through VGD8 are not directly connected with the terminal connecting pins of the microprocessing units CPU1 and CPU2 since said terminal pins provide the assigned signals of the data line but on the contrary the comparators VGD1 through VGD8 are connected with one negative input each in the processing channel of the microprocessor CPU1 by way of AND elements UD11, UD21 through UD81. In the second processing channel which includes microprocessing unit CPU2 the signal supply to the comparators in VGD is supplied from data bus DB2 through AND elements UD12, UD22 through UD82.

Referring to the first processing channel which includes microprocessing unit CPU1 the negative inputs of the AND elements UD11 through UD81 are connected to each other and are connected to one of the six control lines STG1 which at predetermined times issues a control signal DBIN1 particularly to the supplementary modules EB1. This control signal DBIN1 indicates that the data from one memory of supplemental modules EB1 which are to be processed can be entered into microprocessing unit CPU by way of the bidirectional data bus DB1 of microprocessing unit CPU1.

The data present in the selected memory of supplementary modules EB1 can, for example, be input from the process being controlled by way of lines L2 at any random point in time. If signal DBIN1 is present, the data present on the data bus DB1 are not to be supplied to comparators VGD1 through VGD8. This proceeds by blocking the AND gates UD11 through UD81. The same control applies to the control signal DBIN2 in the second processing channel of microprocessing unit CPU2. In the presence of control signal DBIN2 the AND gates UD12 through UD82 are blocked so that the data made available by supplementary modules EB2 for the microprocessor CPU2 also will not reach the comparators VGD1 through VGD8. The reason for this is that the comparison of data which are transferred from the memories of the supplemental modules EB1 and EB2 to the corresponding microprocessing units CPU1 and CPU2 can inspite of simultaneous addressing of the corresponding storage memories be supplied out at slightly different times so that a comparison is not readily possible or such a comparison could lead to a negative result. For this reason, only such data are to be compared with one another in comparators VGD1 through VGD8 which are delivered by way of data buses DB1 and DB2 at specific times from the microprocessing units CPU1 and CPU2 to the memories provided in the allocated supplemental modules EB1 and EB2. At these times, the signals DBIN1 and DBIN2 are not present and the AND gates in the sub-assembly VGD are not blocked.

Control signal comparator VGS includes six comparators VGS1, VGS2 through VGS6 which compare the control signals which are issued by the microprocessing units CPU1 and CPU2 by way of their control lines STG1 and STG2, respectively. One of these control signals will be in the signal DBIN1 or the signal DBIN2 respectively, which has the specific functions within the framework of the sample embodiment discussed above. The inputs of each of the comparators VGS1 through VGS6 are connected to corresponding connecting pins for similar control signals of the microprocessing units CPU1 and CPU2.

All of the comparators in the units VGA and VGD and VGS are connected in series with an input signal US being applied to the first comparator VGA1 of the line address comparator VGA and the output of VGA1 is supplied as an input to the comparator VGA2 and so forth until if all of the comparators provide outputs, the output will reach the output of VGA16. This output is supplied as an input to the data comparator VGD1 which supplies its output under certain conditions to the comparator VGD2 and so forth until under proper conditions an output appears at the output of comparator VGD8. This output is supplied as an input to the comparator VGS1 in the unit VGS. VGS1 supplies an output to the comparator VGS2 under certain conditions and so on until under certain conditions an output is supplied by the comparator VGS6. The pulse current supply TG which also ensures the synchronization in the synchronization circuit SG produces periodically a monitoring pulse US on each processing step and the monitoring pulse US is supplied to the comparator VGA1 which is the first comparator in the series connection. When there is an orderly comparison result, which means that there is a correspondence of the signals connected to the inputs 1 VGA1 and 2VGA2 of the comparator VGA1 the comparator VGA1 will produce an output pulse which is supplied as an input to the comparator VGA2 which is the second comparator in the series connection. In the case of orderly operation of the two channel data processing system, the monitoring pulse US thus passes through all of the comparators and reaches the pulse current supply TG as an error free message FG. When the pulse current supply TG receives the error free message FG, it releases the control pulses necessary for the next processing step of the two channel data processing system. On the basis of this cyclical check, dynamic operation results whereby the pulse current supply TG functions in the manner of a self-controlling circuit which is immediately interrupted if one of the associated comparators in units VGA, VGD, or VGS ascertains a negative comparison result and thus does not forward the monitoring pulse supplied to the next comparator. This results also transpires if one of the comparators becomes defective. As a consequence, not only are the control pulses necessary for the continued data processing blocked, but the relay R will also be de-energized under these conditions which will open contacts R1 and R2, thus, disconnecting direct current voltage supplies GE1 and GE2 to both microprocessing units CPU1 and CPU2 which immediately terminates operation of these units. To accomplish this, a monitor UR receives the incoming error free messages FG and as long as they arrive at the correct cyclical period maintains the relay R energized. However, when the signals FG do not arrive in their regular periods, the monitor UR will provide a signal to disable the relay R and interrupt its current supply, thus, de-energizing it.

It is readily apparent that the invention is also applicable to other microprocessing units equipped with larger or smaller busses and/or having different number of control lines for the control signals. In order to change the computers in this fashion, only the total number of comparators in the units VGA, VGD and VGS need be increased or decreased to the particular number required.

Figure 2:
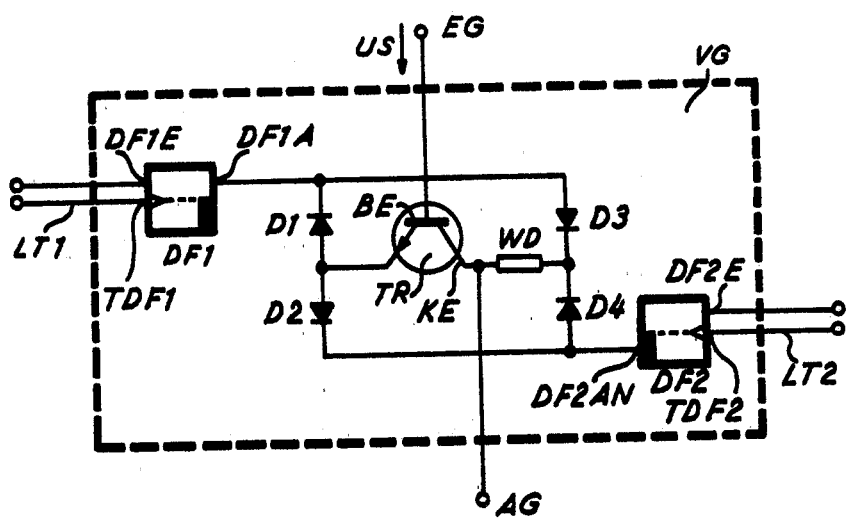
FIG. 2 illustrates a specific sample embodiment of a preferred comparator.

FIG. 2 is a schematic diagram of an advantageous embodiment of a comparator VG which can be used in the two channel data processing system according to FIG. 1.

The comparator according to FIG. 2 consists of a transistor amplifier TR which has a switching circuit path that is fed by way of a rectifier bridge circuit comprising the diodes D1, D2, D3 and D4 and the ohmic resistance WD. The rectifier bridge circuit is connected to the output DF1A of a D-flipflop DF1 and to the negative output DF2 AN of a second D-flipflop DF2 as shown. In the case of an orderly operation of the data processing system illustrated in FIG. 1, both D-flipflops DF1 and DF2 will be in agreement in the one or the other switching position at the time that the comparison control by the monitoring pulse US illustrated in FIG. 1 arrives, and the transistor amplifier TR will always receive a sufficient supply voltage since the rectifier bridge is connected to the potentials so as to always under these conditions provide that the collector will be positive relative to the emitter of transistor TR. In the event of a defective operation of the data processing system illustrated in FIG. 1, both the D-flipflops DF1 and DF2 will be in the opposite switching positions so that the potentials which are supplied from these units to the transistors through the rectifier circuit will be such that supply voltage necessary for transistor conduction of the transistor TR will not exist. Thus, if both flipflops produce a positive signal, a signal of double potential will be applied to one of the elements of the transistor but it will not conduct. Likewise, if the outputs of both flipflops are negative, the transistor will not conduct.

The signals which are to be compared are fed to both inputs DF1E and DF2E of the two D-flipflops DF1 and DF2. Both inputs DF1E and DF2E are, for example, comparable to the inputs 1VGA1 and 2VGA1 of the comparator VGA1 in the system illustrated in FIG. 1. The pulse input TDF1 of the D-flipflop DF1 is connected to the pulse current supply TG as shown in FIG. 1 by way of a separate line LT1. The pulse input TDF2 is connected to the pulse current supply TG by the line LT2 for the D-flipflop DF2. Since as the system according to FIG. 1 illustrates a plurality of comparators are necessary, all of the D-flipflops associated with one channel such as DF1 are with regard to the pulse inputs such as TDF1 connected to the same line LT1. All the D-flipflops allocated to the second channel such as DF2 are regarding their pulse inputs such as TDF2 connected to the other separate line LT2. This guarantees that in the event of a defect in the pulse supply for the D-flipflops this defect will be manifested in only one of the two processing channels and can be recognized and detected. The pulses supplied by way of lines LT1 and LT2 are displaced in time on the output of the pulse current supply TG illustrated in FIG. 1 such that the D-flipflops DF1 and DF2 as well as additional non-illustrated D-flipflops in the other units are switched when the microprocessing units CPU1 and CPU2 illustrated in FIG. 1 which are assigned to the two channels are at the end of their respective execution phase so that the signal conditions which are to be accepted by the D-flipflows have become stably set on the respective lines.

The base electrode BE of the transistor amplifier TR in comparator VG receives at its input terminal EG the monitoring pulse US from the pulse current supply TG illustrated in FIG. 1. The output at terminal AG of the comparator VG is connected to the collector electrode KE of the transistor amplifier TR and supplies a signal as an output only when there is a positive comparison result and when said signal is produced it is then supplied to the next comparator which follows the comparator VG as illustrated relative to FIG. 1.

It is seen that this invention provides a novel error preventing system for digital data processing systems and although it has been described with respect to preferred embodiments, it is not to be so limited as changes and modifications may be made which are within the full intended scope as defined by the appended claims.

I claim as my invention:

1. A data processing system comprising two computing systems receiving input data and independently operating on it, each computing system having separate microprocessing units and separate control, memory and input-output units with address, data and control signal buses, a synchronizing unit connected to said two computing systems, an address comparator unit including a first plurality of comparators connected in series and connected to the address bus of each computing system to compare associated address information, a data comparator unit including a second plurality of comparators connected in series and connected to the data bus of each computing system to compare associated data information, a control signal comparator unit including a third plurality of comparators connected in series and connected to the control signal bus of each computing system to compare associated control signal information, said address comparator unit, said data comparator unit and said control signal comparator unit connected in series, a keyable pulse current supply connected to said two computing systems and supplying an input to said series connected address, data and control signal comparator units and receiving a keyable input pulse therefrom when all of the first, second and third plurality of comparators indicate the same conditions in said two computing systems, first and second power supplies, and first and second switching means controlled by said pulse current supply to respectively connect said first and second power supplies to said two computing system to disconnect power therefrom if any of said plurality of comparators do not receive comparable information.

2. A data processing system according to claim 1 wherein said switching means includes a relay and a pair of switches controlled by said relay to control power to said two computing systems.

3. A data processing system according to claim 2 wherein said switching means includes a monitoring device which monitors said keyable input pulse and controls said relay.

4. A data processing system according to claim 1 wherein said first, second and third plurality of comparators may comprise a transistor switch with a base electrode to which said keyable pulse is supplied, an output terminal connected to the emitter of said transistor switch, a resistor and first and third diodes connected in series between the emitter and collector of said transistor switch, second and fourth diodes and said resistor connected in series between said emitter and collector of said transistor switch, a first flipflop circuit with its output connected to the junction point between said first and third diodes, a second flipflop with its output connected to the junction point between said second and fourth diodes, a pair of first inputs to said first and second flipflop circuits, respectively, supplied from said two computing systems and a pair of second inputs to said first and second flipflop circuits, respectively supplied from said keyable pulse current supply.

5. A data processing system according to claim 4 wherein one of said first and second flipflops provides a negative output and the other provides a positive output.

6. A digital data processing system, particularly for railway safety engineering having respectively two microcomputers with one in each of two channels, a common pulse current supply connected to operate both said microcomputers and having means to generate a monitoring pulse, a plurality of comparators connected in series and each comparator having connections to both microcomputers receiving two comparable signals forming signal pairs, said monitoring pulse supplied to the first comparator of the series connection, and in the event of the presence of matched signal pairs the last comparator of the series connection which is connected to said pulse current supply delivers the monitoring pulse as an error-free message for the purpose of triggering the control signals necessary for the further operating of said two microcomputers as well as for producing a further monitoring pulse, two direct current voltage sources independent of one another, respectively, connected to said two microcomputers, the microprocessing units of said two microcomputers having equal value terminal output pins for addresses, data and control signals which are to be issued, and said terminal output pins being connected in pairs to individual comparators of said plurality of comparators.

7. A data processing system according to claim 6, wherein a monitor is connected to said pulse current supply for detecting dynamic signals so that when there is an error, it disconnects said two direct-current voltage sources from said two microcomputers.

8. A data processing system according to claim 6 wherein said common pulse supply for both microcomputers includes two switching means to generate two independent control pulses which are displaced in phase relative to one another and are supplied over independent lines to the microcomputers.

* * * * *